United States Patent
Suzuki et al.

(10) Patent No.: US 10,112,117 B2
(45) Date of Patent: Oct. 30, 2018

(54) STORAGE MEDIUM, INFORMATION-PROCESSING DEVICE, INFORMATION-PROCESSING SYSTEM, AND INFORMATION-PROCESSING METHOD FOR CONTROLLING MOVEMENT OF GAME CHARACTERS

(71) Applicant: NINTENDO CO., LTD., Kyoto (JP)

(72) Inventors: Toshiaki Suzuki, Kyoto (JP); Yoshinori Tsuchiyama, Kyoto (JP); Shuichiro Nishiya, Sapporo (JP); Takeru Sugimoto, Sapporo (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/485,874

(22) Filed: Apr. 12, 2017

(65) Prior Publication Data

US 2017/0354894 A1 Dec. 14, 2017

(30) Foreign Application Priority Data

Jun. 9, 2016 (JP) .................................. 2016-115628

(51) Int. Cl.
*A63F 9/24* (2006.01)
*A63F 13/88* (2014.01)
*A63F 13/56* (2014.01)
*A63F 13/48* (2014.01)
*A63F 13/44* (2014.01)
(Continued)

(52) U.S. Cl.
CPC .............. *A63F 13/88* (2014.09); *A63F 13/44* (2014.09); *A63F 13/48* (2014.09); *A63F 13/56* (2014.09); *A63F 13/69* (2014.09); *A63F 13/798* (2014.09); *A63F 2300/6036* (2013.01)

(58) Field of Classification Search
CPC ........ A63F 13/10; A63F 13/44; A63F 13/822; A63F 2300/638; A63F 13/63; A63F 13/88
See application file for complete search history.

(56) References Cited

U.S. PATENT DOCUMENTS 8,851,993 B2   10/2014  Nishiya et al.
2007/0197273 A1* 8/2007  Suzuki ............... A63F 3/00006
                                                463/1
(Continued)

FOREIGN PATENT DOCUMENTS

JP          5825855         12/2015

*Primary Examiner* — Steve Rowland
(74) *Attorney, Agent, or Firm* — Nixon & Vanderhye P.C.

(57) ABSTRACT

Movement amount identifying unit 111 of exemplary game device 1 identifies, for each of characters, a movement amount, based on which a character is moved on a map, the movement amount being randomly determined. Movement processing unit 112 moves, for each of the characters, a character on the map based on a movement amount determined for the character. Mini-game executing unit 113 executes a mini-game on detecting that a first character included in the characters has reached a predetermined first cell on the map. When doing so, mini-game executing unit 113 starts the mini-game, the first character joining the mini-game from the start of the mini-game, and causes a second character included in the characters to join the mini-game subsequent to the first character with a delay, the second character having failed to reach the first cell as of the start of the mini-game.

20 Claims, 10 Drawing Sheets

(51) Int. Cl.
*A63F 13/798* (2014.01)
*A63F 13/69* (2014.01)

(56) References Cited

U.S. PATENT DOCUMENTS

| | | | | |
|---|---|---|---|---|
| 2009/0137321 A1* | 5/2009 | Katsume | ................ | A63F 13/12 463/42 |
| 2009/0143137 A1* | 6/2009 | Asano | .................... | A63F 13/00 463/23 |
| 2009/0149232 A1* | 6/2009 | Gosztyla | ................ | A63F 13/10 463/7 |
| 2014/0274371 A1* | 9/2014 | Helava | ................... | A63F 13/10 463/31 |
| 2015/0119143 A1* | 4/2015 | Kuroda | ................ | A63F 13/822 463/31 |

* cited by examiner

STORAGE MEDIUM, INFORMATION-PROCESSING DEVICE, INFORMATION-PROCESSING SYSTEM, AND INFORMATION-PROCESSING METHOD FOR CONTROLLING MOVEMENT OF GAME CHARACTERS

CROSS REFERENCE TO RELATED APPLICATIONS

The disclosure of Japanese Patent Application No. 2016-115628, filed on Jun. 9, 2016, is incorporated herein by reference.

FIELD

An exemplary embodiment relates to a storage medium storing a program for enabling a player to play a game, an information-processing device, an information-processing system, and an information-processing method.

BACKGROUND AND SUMMARY

There is known in the art a game in which a map of a game space consisting of cells is displayed, and player characters may cast a die in turn to traverse a number of cells according to a number shown on the cast die. In the game, when any one of the player characters reaches an event cell, a mini-game starts, in which all the player characters participate.

An exemplary embodiment provides a non-transitory storage medium storing a program for enabling a player to play a game in which characters including at least a player character operated by the player are moved on a map including cells displayed on a display unit, and for causing a computer to execute a process, the process comprising: identifying, for each of the characters, a movement amount, based on which a character is moved on the map, the movement amount being randomly determined; moving, for each of the characters, a character on the map based on a movement amount determined for the character; and executing a mini-game on detecting that a first character included in the characters has reached a predetermined first cell on the map, wherein: the step of moving a character comprises moving the player character on the map based on an input operation performed by the player and a movement amount determined for the player character; and the step of executing a mini-game comprises: starting the mini-game, the first character joining the mini-game from the start of the mini-game; and causing a second character included in the characters to join the mini-game subsequent to the first character with a delay, the second character having failed to reach the first cell as of the start of the mini-game.

DETAILED DESCRIPTION OF NON-LIMITING EXEMPLARY EMBODIMENTS

1. Embodiment 1-1. Configuration

Figure 1:
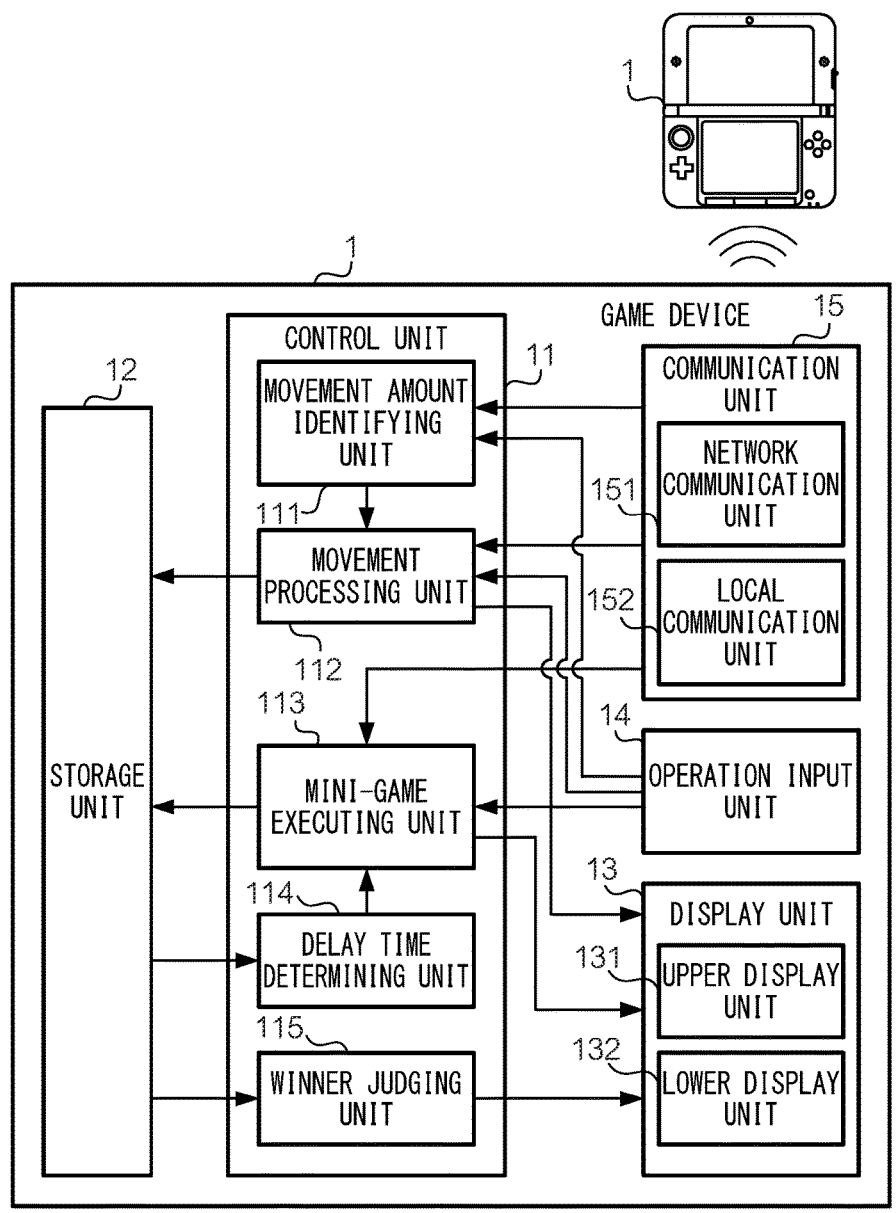
FIG. 1 is a block diagram showing an example of a configuration of game device 1.

FIG. 1 is a block diagram showing an example of a configuration of game device 1 according to an embodiment. Game device 1 is an example of an information-processing device, which is, specifically, a portable computer game device. Game device 1 includes control unit 11, storage unit 12, display unit 13, operation input unit 14, and communication unit 15, as shown in FIG. 1.

Control unit 11 includes a processor such as a CPU or a GPU, and a volatile memory. Control unit 11 executes a program stored in storage unit 12 to perform image processing to generate images to be displayed by display unit 13. Storage unit 12 is a nonvolatile memory such as a flash memory, which stores programs to be executed by control unit 11. It is of note that storage unit 12 may be an external storage medium in another embodiment. Display unit 13 includes upper display unit 131 and lower display unit 132, each of which is a display device such as a liquid crystal display or an organic electro-luminescence display. Operation input unit 14 includes a touch sensor placed on top of lower display unit 132, an arrow key, an analog stick, or any other operation buttons. Communication unit 15 includes network communication unit 151 and local communication unit 152. Network communication unit 151 is a communication module for communicating with one or more other game devices 1 through a network such as a wireless LAN or the Internet. Local communication unit 152 is a communication module for performing a wireless or infrared communication with one or more other game devices 1.

Figure 2:
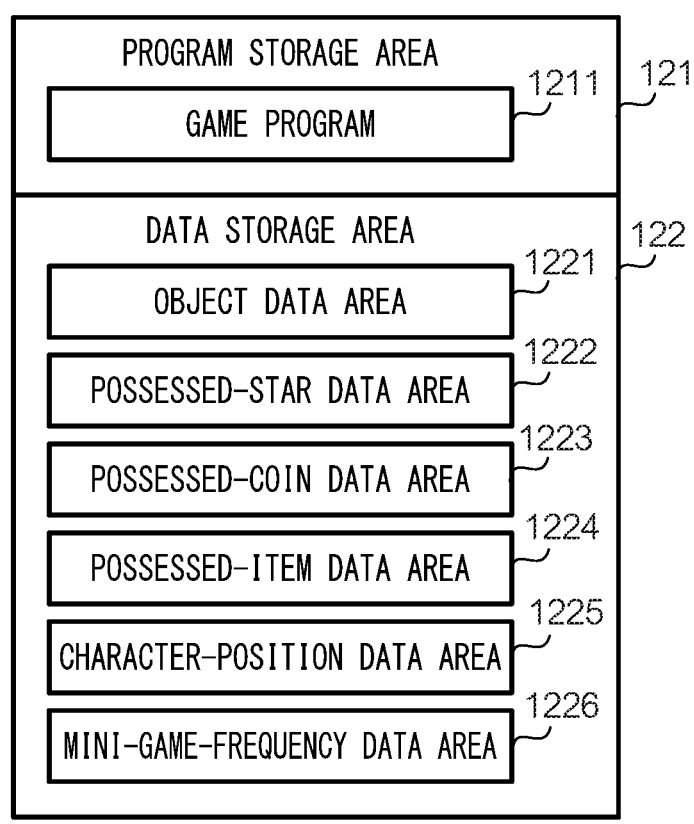
FIG. 2 is a diagram showing an example of a storage area of storage unit 12.

FIG. 2 is a diagram showing an example of a storage area of storage unit 12. Storage unit 12 includes program storage area 121 and data storage area 122.

Program storage area 121 stores game program 1211 for enabling a player to play a game, which is, specifically, a board game, and more specifically a dice board game. In the game, characters are moved on a map consisting of cells displayed on display unit 13, and a winner is determined based on a comparison of numbers of predetermined items collected by the characters after a predetermined number of mini-games have been executed in the game. The predetermined items are, for example, stars. The cells are areas constituting the map, which represent units of movement of a character. The cells may be any shape. The characters appearing in the game may consist of two or more player characters operated by human players, or of one or more player characters operated by human players and one or more non-player characters controlled by control unit 11 according to game program 1211. The human players are, specifically, players of game devices 1 that perform communications using communication unit 15. Each game device 1 according to the present embodiment is a portable game device, which causes display unit 13 to display game images for a player operating the game device. For example, the game images are generated by image processing, whereby a virtual camera is controlled so that at least a player character operated by the player is shown in the game images. When a game is played on a single game device 1 using a player character operated by a player and one or more non-player characters, control unit 11 of the game device performs game processing on actions of the player character based on input operations performed by the player, while performing game processing on actions of non-player characters according to a preset program, and causes display unit 13 to display game images based on the results of both the game processing on actions of the player character and the game processing on actions of non-player characters. When a game is played by human players, the game is executed on each of game devices 1. The game devices cause display unit 13 to display different game images for each player; however, the game devices share developments of the game. For example, when game device 1, which is a parent device, obtains, using communication unit 15, data indicative of input operations or results of input operations performed by players of other game devices 1, the game device may perform game processing based on its own input operation data and the obtained data, and thereafter send data indicative of a result of the game processing to other game devices, while causing display unit 13 to display game images showing the same result. In that case, the other game devices, on receipt of the data sent from the parent game device, perform image processing based on the received data to cause display unit 13 to display game images for its player.

The above mini-game is a game included in the game provided by execution of game program 1211. During execution of the mini-game particular scenarios and scenes are provided, and the mini-game is played according to rules different from those of the board game, which is the main game. The mini-game is, in other words, a sub-game. The mini-game ends in a shorter time than the main game. All characters join the mini-game. When the mini-game is played, a character that has reached a predetermined mini-game cell joins first, and the other characters that have failed to reach the mini-game cell join later. In particular, the other characters join the mini-game after a delay determined according to a distance from the character's current cell to the mini-game cell.

The mini-game is a game that provides an advantage to a character that joins the game earlier. In particular, in the mini-game, a character that has accumulated a higher value during a period from the start of the game until a predetermined end condition for the mini-game is satisfied, is granted a higher ranking. A ranking is determined for each character after the mini-game has ended. In addition, the mini-game is a game that becomes difficult in proportion to an elapsed time. However, characters that have joined the mini-game late may overtake other characters by playing the game well.

The mini-game is, for example, a game in which characters collect items of fruit scattered on a stage in a basket, while avoiding enemy characters, to compete to collect a high number of items of fruit. In another example, the mini-game is a game in which characters load bombs scattered on a stage into a cannon to shoot at a boss character, while avoiding enemy characters, to compete to hit the boss character with a high number of bombs. In another example, the mini-game is a game in which characters compete to travel a long distance from start to finish of the mini-game. The game is, specifically, a racing game.

A character ranked highest as a result of the mini-game is awarded a star. The number of obtained stars is used to determine a winner of the main game. The main game may end according to any end condition. For example, the main game may end on condition that a predetermined number of mini-games have been executed.

Data storage area 122 includes object data area 1221, possessed-star data area 1222, possessed-coin data area 1223, possessed-item data area 1224, character-position data area 1225, and mini-game-frequency data area 1226. Object data area 1221 stores data necessary to execute the board game, such as map data or character data. Possessed-star data area 1222 stores data indicative of the number of stars for each character. Possessed-coin data area 1223 stores data indicative of the number of coins for each character. A predetermined number of coins may be converted to a star. Possessed-item data area 1224 stores, for each character, data on items that are virtual game-elements useful in playing the board game. Character-position data area 1225 stores data indicative of a position on a map of the board game for each character. Mini-game-frequency data area 1226 stores data indicative of the number of mini-games executed in the board game.

Control unit 11, by executing game program 1211, provides functions of movement amount identifying unit 111, movement processing unit 112, mini-game executing unit 113, delay time determining unit 114, and winner judging unit 115.

Movement amount identifying unit 111 identifies, for each of characters, a movement amount for which a character is to travel on a map, which movement amount is randomly determined. Specifically, movement amount identifying unit 111 identifies a movement amount by generating a random number. The movement amount herein, specifically, refers to the number of cells. When identifying a movement amount, movement amount identifying unit 111 causes display unit 13 to display an animation of a die being cast. Movement amount identifying unit 111 repeatedly identifies a movement amount until an end condition for the game is satisfied. Even after a mini-game is concluded, movement amount identifying unit 111 repeats the processing until the end condition is satisfied.

Movement processing unit 112, after a movement amount is identified by movement amount identifying unit 111, for each of characters, moves a character on a map according to a movement amount identified by the movement amount identifying unit for the character. Movement processing unit 112 carries out this process for all the characters simultaneously. Specifically, movement processing unit 112 concurrently accepts selections and determinations of migration routes performed by players using operation input unit 14. Also, when movement processing unit 112 moves a player character, the unit moves the player character based on an input operation performed by a player using operation input unit 14. Specifically, the movement processing unit moves the player character along a route selected by the player using the operation input unit. Also, movement processing unit 112, on detecting that one of the characters has reached a predetermined item cell, causes the character to obtain an item. Specifically, the movement processing unit stores data on the item in possessed-item data area 1224 in association with the character.

Available items are divided into three types; an item useful in playing a mini-game; an item useful in moving on a map; and an item that directly affects winning and losing of the main game in a positive way.

An item useful in playing a mini-game is, specifically, an item that helps to raise a ranking of a subject character, which ranking is determined among characters after execution of a mini-game. The item may include, for example, an item that enables a non-player character for supporting a subject character to appear in a mini-game, together with the subject character, an item that enables hindering of another player playing a mini-game by narrowing a display area of the other player's mini-game execution screen, and an item that enables hindering of another player playing a mini-game by temporarily stunning the other player's character.

An item useful in moving on a map is, specifically, an item that, when movement amount identifying unit 111 identifies a movement amount for each character after the item is obtained, enables a movement amount identified for a subject character to be increased as compared to a case in which the item is not used, or that enables a movement amount for another character to be decreased as compared to a case in which the item is not used. The item may include, for example, an item that enables addition of a numerical value to a number on a die cast by a subject character, an item that enables limitation of numbers on a die to be used by a subject character to favorable numbers, and an item that enables the number of dice to be used by a subject character to be increased. Also, the item may include an item that enables a number on a die cast by another character to be decreased, and an item that enables limitation of numbers on a die to be used by another character to unfavorable numbers. Further, the item may include an item that enables a number on a die to be restricted to a particular number.

An item that directly affects winning and losing of the main game in a positive way is, specifically, an item that enables a value to be increased, which decides winning and losing of the main game. For example, the item may include an item that enables the number of stars or coins possessed by a subject character to be increased.

Mini-game executing unit 113 executes a mini-game on detecting that any one of characters has reached a predetermined mini-game cell on a map. When doing so, mini-game executing unit 113 starts the mini-game, the character joining the mini-game from the start of the game, which character has reached the mini-game cell. Also, mini-game executing unit 113 causes the other characters that have failed to reach the mini-game cell as of the start of the mini-game to join the mini-game later than the character that has reached the mini-game cell.

When a player character is included in the other characters that have failed to reach the mini-game cell, mini-game executing unit 113 shortens a delay time in response to a predetermined input operation performed by a player to operation input unit 14. The predetermined input operation may include, for example, pressing an operation button, rubbing on a surface of a touch sensor, or rotating an analog stick. The delay time is shortened in proportion to the number of the predetermined input operations.

Mini-game executing unit 113 causes display unit 13 to display simultaneously an execution screen for the mini-game and a delay time display screen that shows a time that elapses before the characters that have failed to reach the mini-game cell join the mini-game. The execution screen is displayed, for example, on upper display unit 131, and the delay time display screen is displayed, for example, on lower display unit 132. The delay time display screen shows an animation of icons representing the characters that have failed to reach the mini-game cell, which icons move from cells occupied by the characters as of the start of the mini-game to the mini-game cell. Distances from the icons on display to the mini-game cell indicate times that elapse before the characters that have failed to reach the mini-game cell join the mini-game. Moving speed of the icons may be increased in response to the predetermined input operation performed by a player.

Delay time determining unit 114 determines a delay time for a character that has failed to reach a mini-game cell, based on a distance from a cell occupied by the character as of the start of a mini-game to the mini-game cell. The delay time is proportional to the distance. Delay time determining unit 114 determines the delay time by referring to, for example, a correspondence table in which the numbers of cells and delay times are associated with each other.

Winner judging unit 115, after mini-game executing unit 113 executes a predetermined number of mini-games, refers to the numbers of stars possessed by the characters recorded in possessed-star data area 1222 to rank characters in descending order of the number of possessed stars.

1-2. Operation

Figure 3:
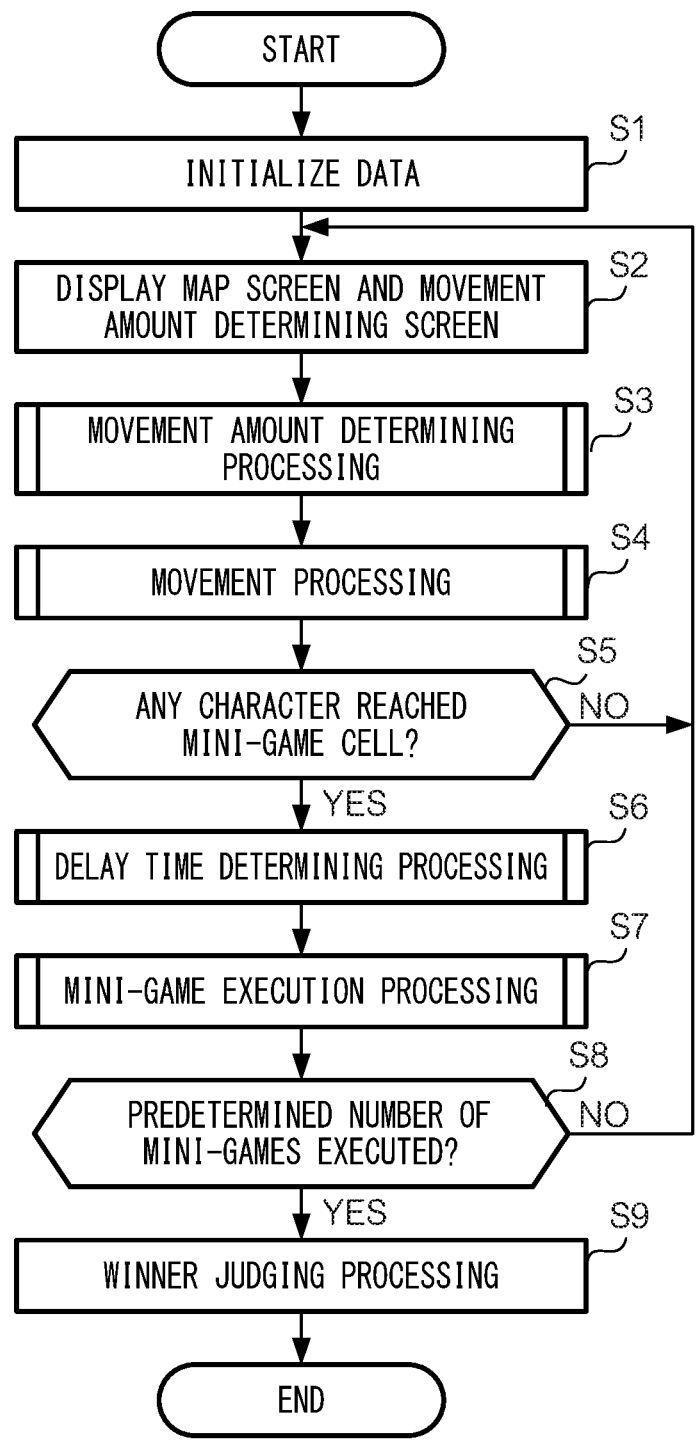
FIG. 3 is a flowchart showing an example of game execution processing.

Game execution processing executed by control unit 11 of game device 1 will be described. FIG. 3 is a flowchart showing an example of the game execution processing. It is of note that processing described below is directed to all participant characters; however, in typical cases, processing is executed by control unit 11 of game device 1 that enables a game play using a player character and one or more non-player characters, or by control unit 11 of game device 1 that is a parent device that enables a game play using player characters together with other game devices 1. In another case where plural game devices 1 are used, a part of processing described below may be executed in other game devices 1; in other words, a game system including game devices 1 may execute the processing. In any case, display unit 13 of each of game devices 1 displays images for a player of the device.

When a player of game device 1 provides an instruction to execute game program 1211, using operation input unit 14, control unit 11 initializes data storage area 122 (step S1).

Figure 4:
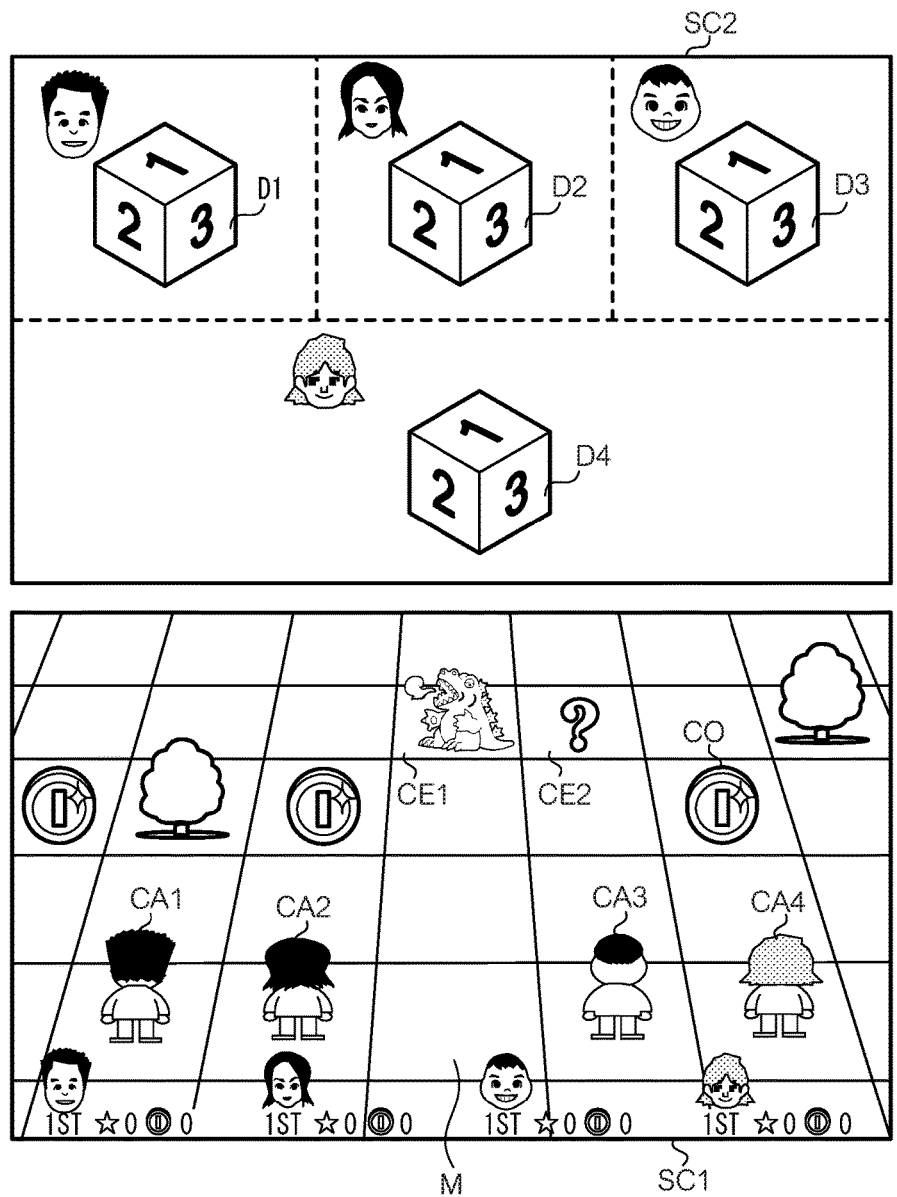
FIG. 4 is a diagram showing an example of map screen Sc1 and movement amount determining screen Sc2.

On completion of the initialization, control unit 11 generates map screen Sc1 and movement amount determining screen Sc2 to be displayed on display unit 13, based on data stored in data storage area 122 (step S2). FIG. 4 is a diagram showing an example of map screen Sc1 and movement amount determining screen Sc2. Map screen Sc1 is displayed on, for example, lower display unit 132, and movement amount determining screen Sc2 is displayed on, for example, upper display unit 131. The screens displayed on display unit 13 are game screens directed to the player of game device 1. In a case where the game is played using game devices 1, display unit 13 of each of the game devices displays different game images.

In map screen Sc1, map M is shown, which consists of cells arranged in a grid pattern. Since map M has grid-pattern cells, a character can move back and forth and in left and right directions. Accordingly, the player can select one of multiple routes to a desired cell. The cells constituting map M include one or more mini-game cells Ce1. The cells may also include one or more item cells Ce2 and cells in which coin Co is provided. Also, in map screen Sc1, characters Ca1 to Ca4 are shown on map M, and at the bottom of the screen, a ranking, the number of possessed stars, and the number of possessed coins are shown for each of the characters. In movement amount determining screen Sc2, dice D1 to D4 are shown for characters Ca1 to Ca4. One of characters Ca1 to Ca4 is a player character to be operated, and the others are player characters operated by other game devices 1 or non-players. FIG. 4 shows an example in which character Ca4 is a player character to be operated.

Figure 5:
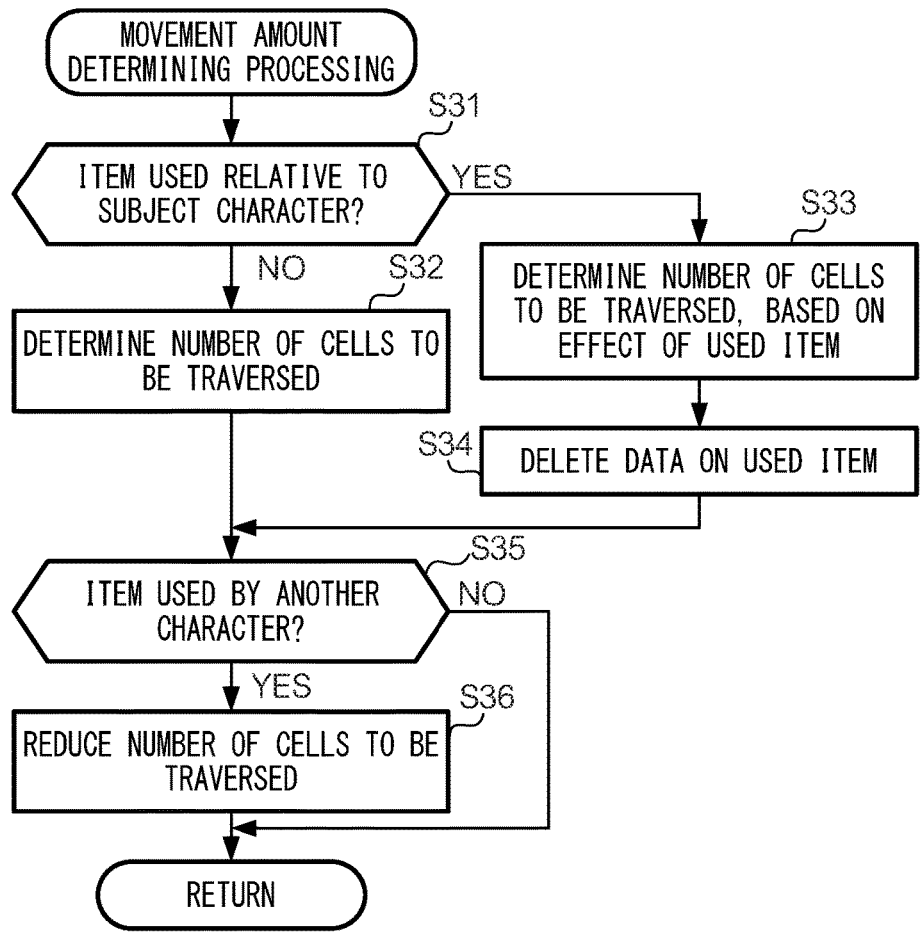
FIG. 5 is a flowchart showing an example of movement amount determining processing.

After map screen Sc1 and movement amount determining screen Sc2 are displayed on display unit 13, control unit 11 executes movement amount determining processing (step S3). FIG. 5 is a flowchart showing an example of the movement amount determining processing. The movement amount determining processing is executed for each of characters in parallel.

Control unit 11 determines whether an item has been used relative to the subject character (step S31). As a result of the determination, when no item has been used (step S31, NO), control unit 11 generates a random number to determine the number of cells to be traversed (step S32). On the other hand, as a result of the determination, when an item has been used (step S31, YES), control unit 11 determines the number of cells to be traversed, in view of an effect of the used item (step S33). For example, when an item that enables addition of a numerical value to a number on the cast die has been used for the subject character, control unit 11 generates a random number and adds the numerical value to the generated number to determine the number of cells to be traversed. Also, control unit 11 deletes data on the used item from possessed-item data area 1224 (step S34).

After determining the number of cells to be traversed, control unit 11 determines whether an item has been used by another character relative to the subject character (step S35). As a result of the determination, when no item has been used (step S35, NO), control unit 11 concludes the movement amount determining processing. On the other hand, when an item has been used (step S35, YES), control unit 11 reduces the number of cells to be traversed, in view of an effect of the used item (step S36). For example, when an item that enables subtraction of a numerical value from a number on the cast die has been used for the subject character, control unit 11 subtracts the numerical value from the determined number of cells to be traversed. After performing step S36, control unit 11 concludes the movement amount determining processing.

Figure 6:
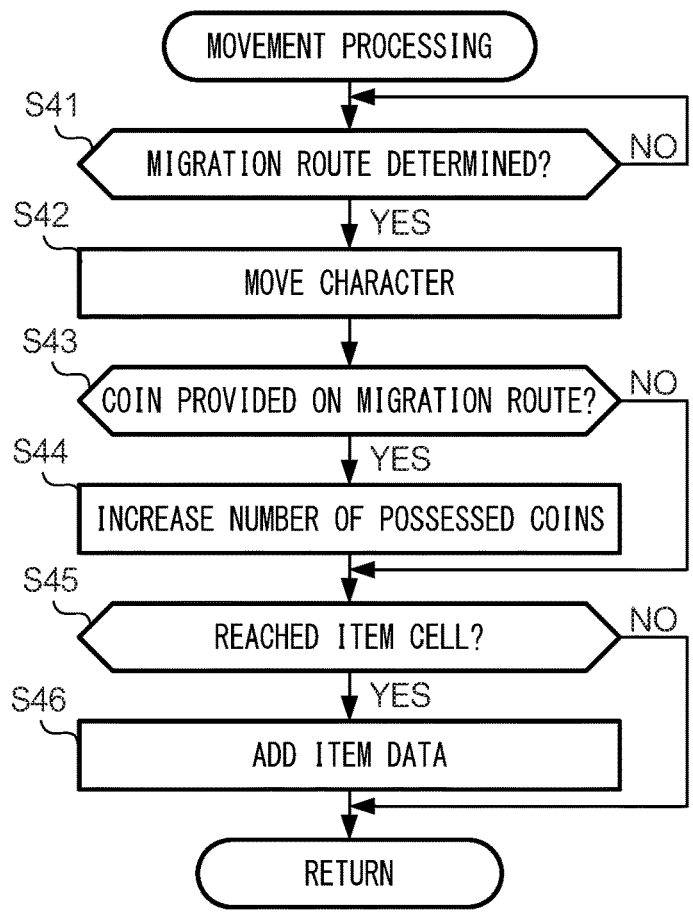
FIG. 6 is a flowchart showing an example of movement processing.

On completion of the movement amount determining processing for all the characters, control unit 11 executes movement processing (step S4). FIG. 6 is a flowchart showing an example of the movement processing. The movement processing is executed for each of the characters in parallel.

Control unit 11 determines whether a migration route has been determined for the subject character (step S41). As a result of the determination, when a migration route has not yet been determined (step S41, NO), control unit 11 performs step S41 again. On the other hand, when a migration route has been determined (step S41, YES), control unit 11 moves the subject character along the determined migration route (step S42). Specifically, control unit 11 updates position data of the subject character stored in character-position data area 1225 to position data indicative of the position to which the character has moved.

After moving the subject character, control unit 11 determines whether coins were provided on the migration route (step S43). As a result of the determination, when no coin was provided (step S43, NO), control unit 11 proceeds to step S45. On the other hand, when coins were provided (step S43, YES), control unit 11 increases the number of possessed coins for the subject character recorded in possessed-coin data area 1223, based on the number of coins that were provided on the migration route (step S44). It is of note that an item other than coins, which can be obtained by reaching an item cell, may be provided on a cell, which item may be obtained by a character that has passed through the cell.

At step S45, control unit 11 determines whether the cell that the subject character has reached is an item cell. As a result of the determination, when the cell that the subject character has reached is not an item cell (step S45, NO), control unit 11 concludes the movement processing. On the other hand, when the cell that the subject character has reached is an item cell (step S45, YES), control unit 11 randomly selects an item to be obtained by the subject character to store data on the selected item in possessed-item data area 1224 in association with the subject character (step S46). After performing step S46, control unit 11 concludes the movement processing. It is of note that while the character is moving, control unit 11 causes display unit 13 to display an animation of the character on the move or an animation of the character obtaining an item.

Figure 7:
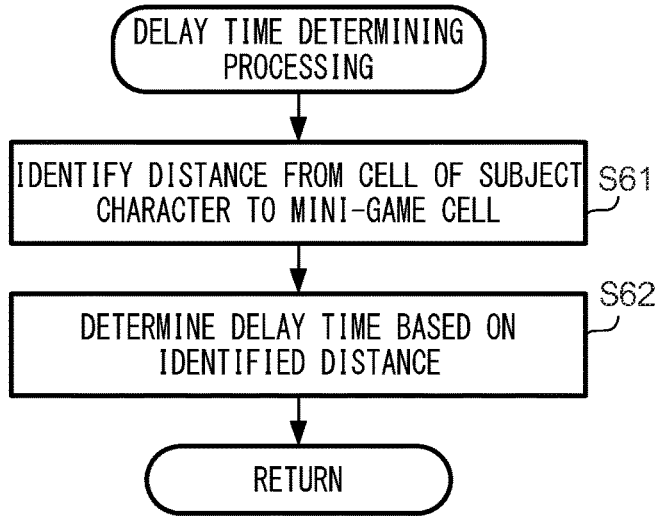
FIG. 7 is a flowchart showing an example of delay time determining processing.

On completion of the movement processing for all the characters, control unit 11 determines whether any one of the characters has reached a mini-game cell (step S5). As a result of the determination, when no character has reached a mini-game cell (step S5, NO), control unit 11 returns to step S2. On the other hand, as a result of the determination, when any one of the characters has reached a mini-game cell (step S5, YES), control unit 11 executes delay time determining processing (step S6). FIG. 7 is a flowchart showing an example of the delay time determining processing. The delay time determining processing is executed for each of the characters in parallel.

Control unit 11 identifies a distance from the current cell to the mini-game cell for the subject character (step S61). After identifying the distance, control unit 11 determines a delay time based on the identified distance (step S62). For example, when the distance from the current cell to the mini-game cell for the subject character is "0 (cells);" in other words, when the subject character has reached the mini-game cell, control unit 11 determines that a delay time is "0 (seconds)." In another example, when the distance is "2 (cells)," storage unit 12 determines that a delay time is "5 (seconds)." After determining the delay time, control unit 11 concludes the delay time determining processing.

Figure 8:
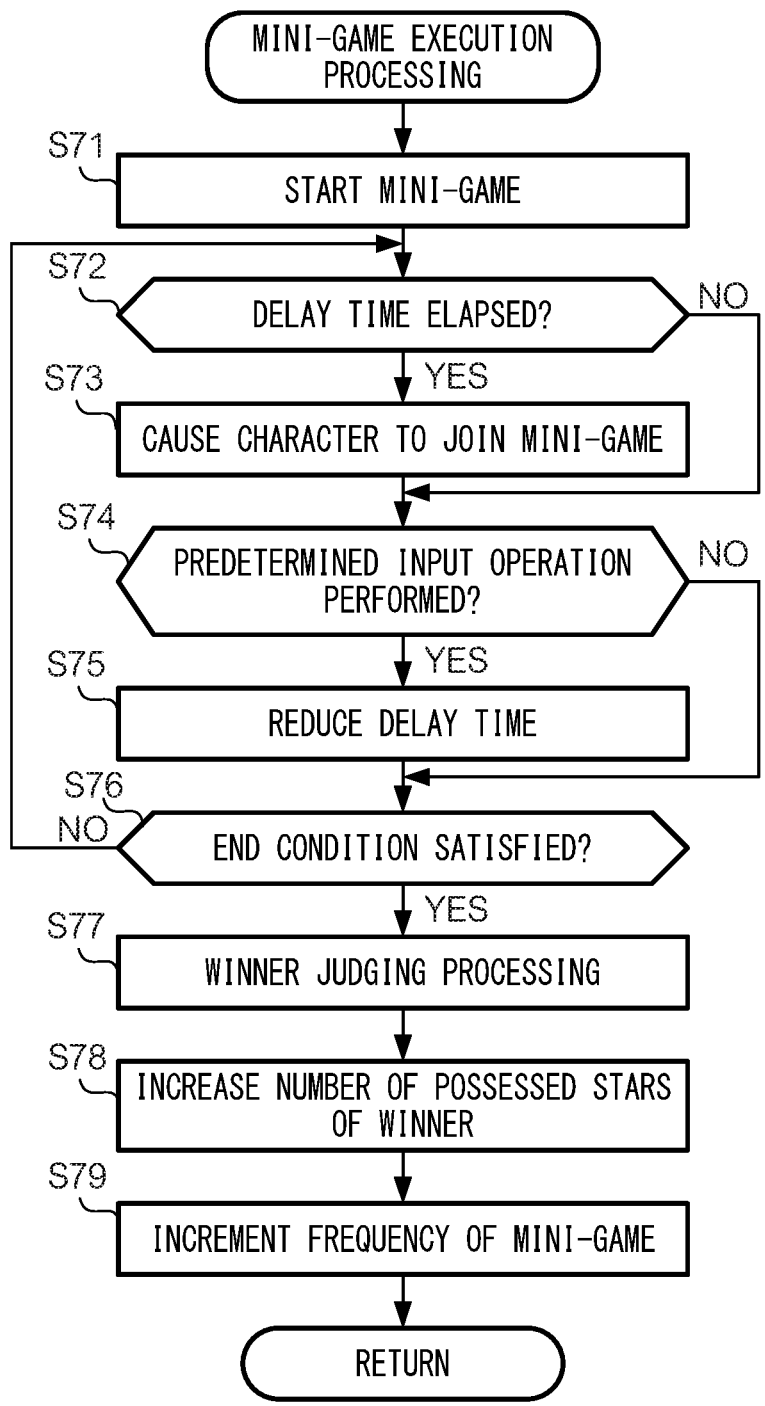
FIG. 8 is a flowchart showing an example of mini-game execution processing.

On completion of the delay time determining processing for all the characters, control unit 11 executes mini-game execution processing (step S7). FIG. 8 is a flowchart showing an example of the mini-game execution processing.

Figure 9:
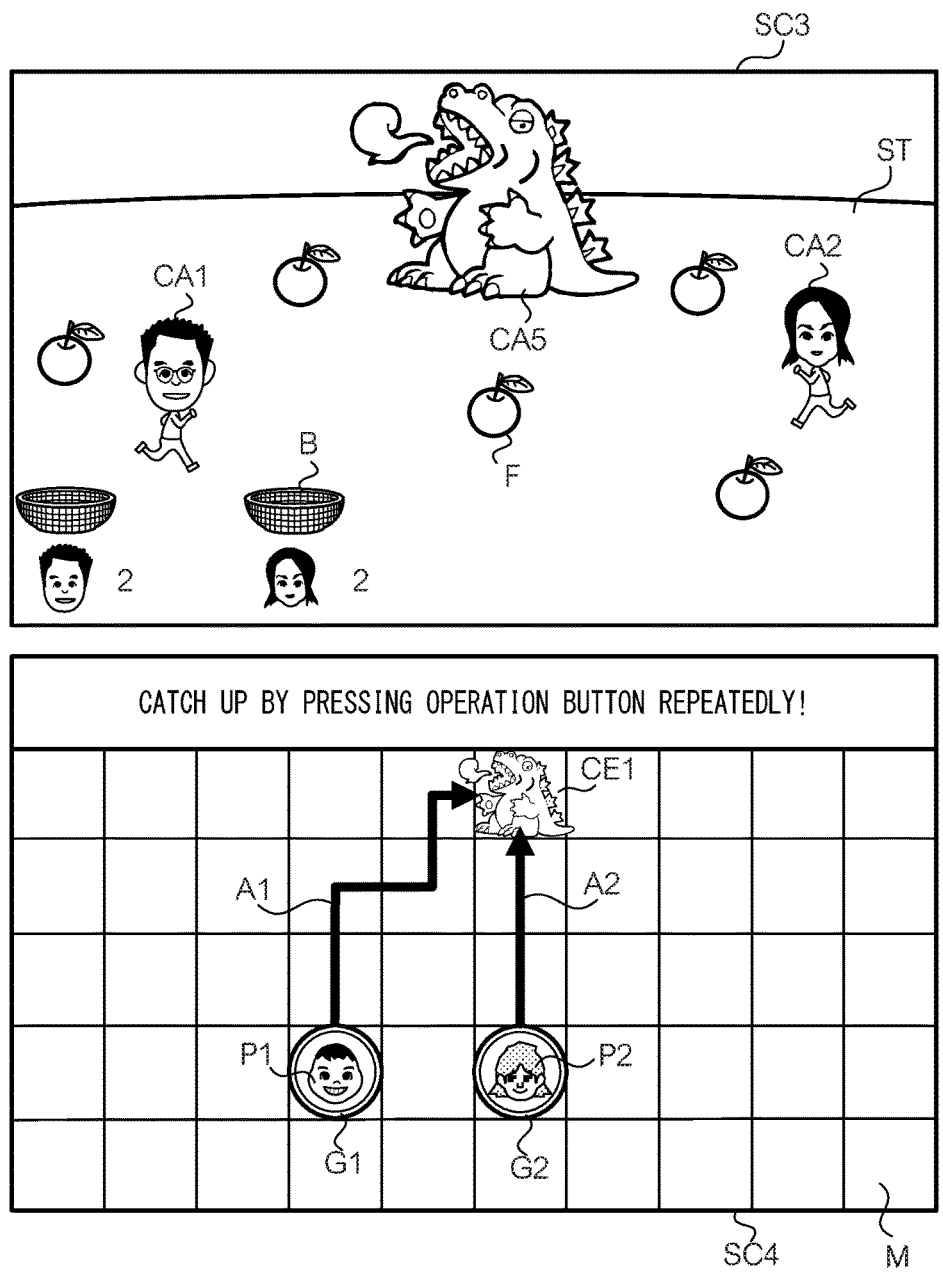
FIG. 9 is a diagram showing an example of mini-game executing screen Sc3 and delay time display screen Sc4.

Control unit 11 starts a mini-game (step S71). Specifically, control unit 11 starts a mini-game, and a character whose delay time determined by the delay time determining processing is "0 (seconds)," in other words, a character that has reached the mini-game cell, joins the game from the start. When the character of the player of game device 1 has reached the mini-game cell, the player plays the mini-game using operation input unit 14. Control unit 11 performs processing for enabling the player to play the mini-game, which processing may include moving the character according to the player's input operations. Also, control unit 11 causes display unit 13 to display mini-game execution screen Sc3 and delay time display screen Sc4. FIG. 9 is a diagram showing an example of mini-game execution screen Sc3 and delay time display screen Sc4. Mini-game execution screen Sc3 is displayed on, for example, upper display unit 131, and delay time display screen Sc4 is displayed on, for example, lower display unit 132. The example shown in FIG. 9 is based on an assumption that characters Ca1 and Ca2 have reached the mini-game cell, while characters Ca3 and Ca4 have failed to reach the mini-game cell.

In mini-game execution screen Sc3, stage St of the mini-game, characters Ca1 and Ca2, and enemy character Ca5 are shown. The mini-game shown in FIG. 9 is a game in which characters collect fruits F scattered on stage St in basket B, while avoiding enemy character Ca5, to compete to collect the highest number of fruits F. Also, at the bottom of mini-game execution screen Sc3, the number of fruits F collected is shown for each of characters Ca1 and Ca2.

Figure 10:
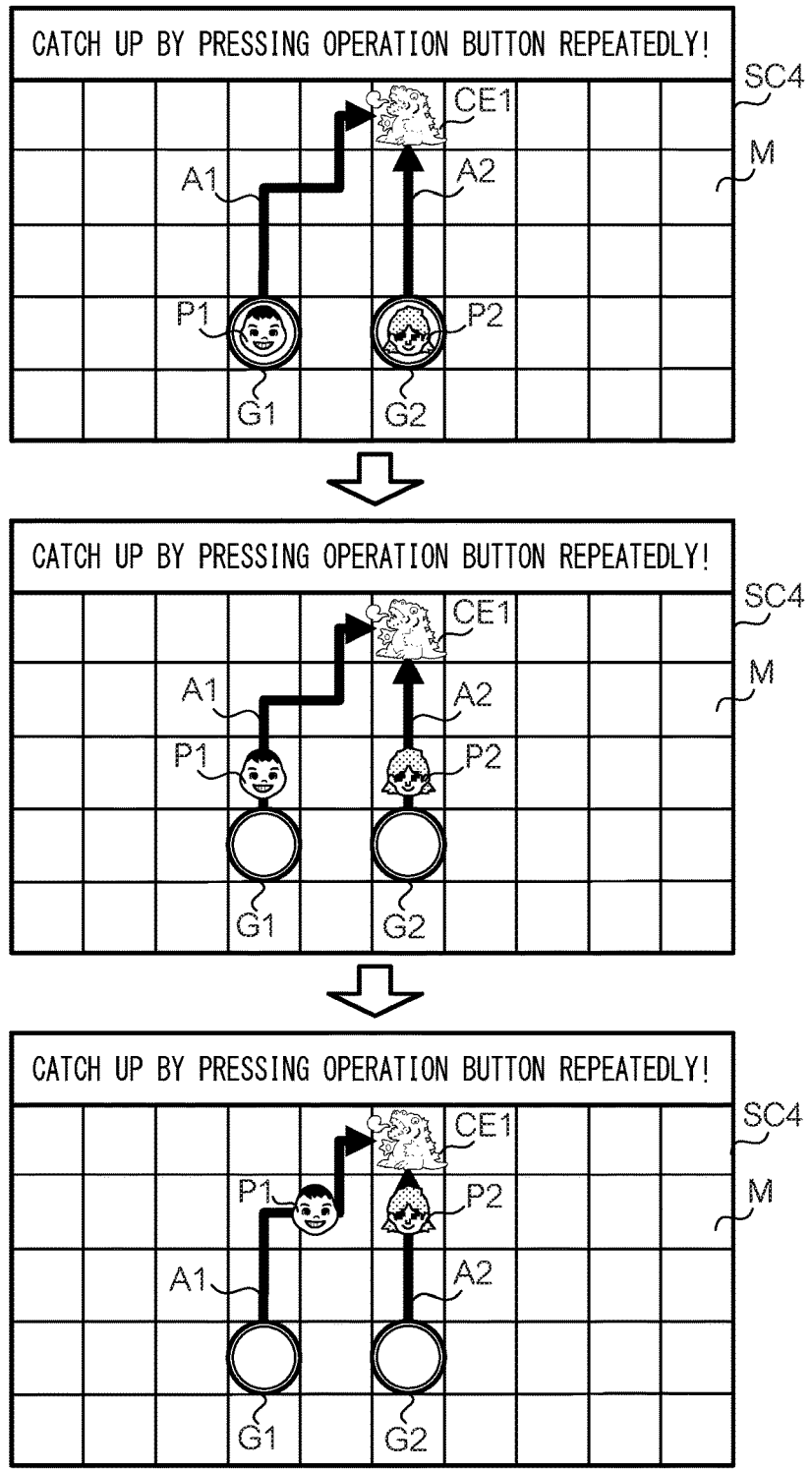
FIG. 10 is a diagram showing an example of transition of delay time display screens Sc4.

In delay time display screen Sc4, map M is shown as a planar view. The cells constituting map M include mini-game cell Ce1. Also, in delay time display screen Sc4, double-circle mark G1 indicative of a position of character Ca3 as of the start of the mini-game, double-circle mark G2 indicative of a position of character Ca4 as of the start of the mini-game, icon P1 representing character Ca3, and icon P2 representing character Ca4 are shown. Mark G1 indicating a position of character Ca3 is connected to mini-game cell Ce1 by arrow A1 indicating the shortest path therebetween. Mark G2 indicating a position of character Ca4 is connected to mini-game cell Ce1 by arrow A2 indicating the shortest path therebetween. Icons P1 and P2 move toward mini-game cell Ce1 as time passes, as shown in FIG. 10. Icon P1 representing character Ca3 moves along arrow A1 so that the icon can reach mini-game cell Ce1 at the same time that a delay time for the character elapses. Icon P2 representing character Ca4 moves along arrow A2 so that the icon can reach mini-game cell Ce1 at the same time that a delay time for the character has elapses. A delay time for character Ca3 or Ca4 is shortened in response to a player's pressing of an operation button; as a result, an icon representing the character is caused to move faster.

Figure 11:
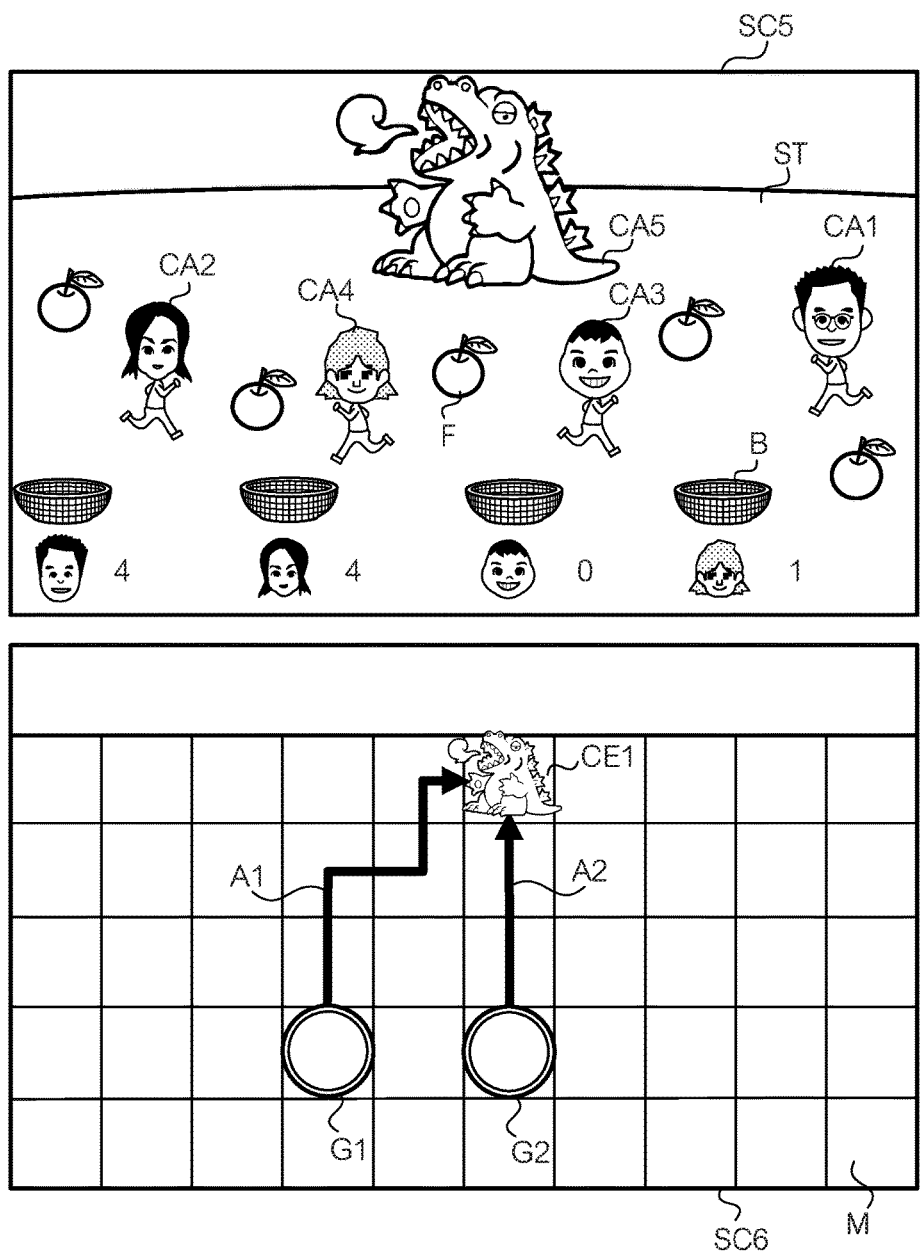
FIG. 11 is a diagram showing an example of mini-game execution screen Sc5 and delay time display screen Sc6.

After starting the mini-game, control unit 11 determines whether a delay time for any one of characters has elapsed (step S72). As a result of the determination, when a delay time has elapsed for none of characters (step S72, NO), control unit 11 proceeds to step S74. On the other hand, when a delay time for any one of characters has elapsed (step S72, YES), control unit 11 causes a character whose delay time has elapsed to join the mini-game (step S73). FIG. 11 is a diagram showing an example of mini-game execution screen Sc5 and delay time display screen Sc6, which are displayed on display unit 13 after a delay time has elapsed. Mini-game execution screen Sc5 is displayed on, for example, upper display unit 131, and delay time display screen Sc6 is displayed on, for example, lower display unit 132. The example shown in FIG. 11 is based on an assumption that characters Ca1 and Ca2 have already reached the mini-game cell, and delay times for characters Ca3 and Ca4 have elapsed.

In mini-game execution screen Sc5, stage St of the mini-game, characters Ca1 to Ca4, and enemy character Ca5 are shown. The mini-game shown in FIG. 11 is similar to that shown in FIG. 9, and carries on from that shown in FIG. 9. Also, at the bottom of mini-game execution screen Sc5, the number of fruits F collected is shown for each of characters Ca1 to Ca4. The screen shown in FIG. 11 is different from that shown in FIG. 9 in that characters Ca3 and Ca4 have joined the mini-game, and in that characters Ca1 and Ca2, which have joined the mini-game earlier, have obtained more fruits F.

In delay time display screen Sc6, map M is shown as a planar view. The cells constituting map M include mini-game cell Ce1. Also, in delay time display screen Sc6, double-circle mark G1 indicative of a position of character Ca3 as of the start of the mini-game, and double-circle mark G2 indicative of a position of character Ca4 as of the start of the mini-game are shown. Mark G1 indicating a position of character Ca3 is connected to mini-game cell Ce1 by arrow A1 indicating the shortest path therebetween. Mark G2 indicating a position of character Ca4 is connected to mini-game cell Ce1 by arrow A2 indicating the shortest path therebetween. The screen shown in FIG. 11 is different from that shown in FIG. 9 in that icon P1 representing character Ca3 and icon P2 representing character Ca4 are not shown since delay times for the characters have elapsed.

At step S74, control unit 11 determines whether any player operating a character, whose delay time has not elapsed, has performed a predetermined input operation, using operation input unit 14. For example, control unit 11 determines whether any player operating such a character has pressed an operation button. The player of game device 1, if a delay time for the character has not elapsed, is able to perform the predetermined input operation relative to operation input unit 14 to shorten the delay time. As a result of the determination of step S74, when the predetermined input operation has not been performed (step S74, NO), control unit 11 proceeds to step S76. On the other hand, as a result of the determination, when the predetermined input operation has been performed (step S74, YES), control unit 11 shortens a delay time for a character on which the predetermined input operation has been performed (step S75).

At step S76, control unit 11 determines whether an end condition for the mini-game has been satisfied. As a result of the determination, when the end condition for the mini-game has not been satisfied (step S76, NO), control unit 11 returns to step S72. On the other hand, when the end condition for the mini-game has been satisfied (step S76, YES), control unit 11 performs winner judging processing for the mini-game (step S77). Specifically, control unit 11 compares values accumulated by the characters during the mini-game to identify a character that has accumulated the highest value. After identifying the character, control unit 11 increases the number of possessed stars recorded in possessed-star data area 1222 in association with the character (step S78).

After updating the number of possessed stars, control unit 11 increments the number of executed mini-games recorded in mini-game-frequency data area 1226 (step S79). After performing step S79, control unit 11 concludes the mini-game execution processing.

On completion of the mini-game execution processing, control unit 11 determines whether an end condition for the board game (the main game) has been satisfied by determining whether a predetermined number of mini-games have been executed (step S8). For example, control unit 11 determines whether a mini-game has been executed three times. As a result of the determination, when a predetermined number of mini-games have not been executed (step S8, NO), control unit 11 returns to step S2. At the same time, control unit 11 sets a new mini-game cell. It is of note that when step S2 is performed again, each character may be located at a cell occupied by the character as of the start of the mini-game, not at the mini-game cell. When the characters are deployed in such a way, a character that joined the previous mini-game later may restart the main game from a position near a next mini-game. In view of this, a player, whose character is unlikely to reach a mini-game cell early, may consider an option of not moving toward the mini-game cell to gain an advantage in a next mini-game. Namely, such a deployment makes the main game strategic. As a result of the determination made at step S8, when a predetermined number of mini-games have not been executed (step S8, YES), control unit 11 executes winner judging processing for the main game (step S9). Specifically, control unit 11 refers to the numbers of possessed stars for the characters recorded in possessed-star data area 1222 to rank the characters in descending order of the number of possessed stars, and causes display unit 13 to display the rankings. On completion of the winner judging processing, control unit 11 concludes the game execution processing.

In the game execution processing described in the foregoing, characters that have failed to reach a mini-game cell are required to wait before joining a mini-game. In other words, differences in position on a map between characters are reflected in a mini-game. Accordingly, players need to consider their migration routes on a map in view of a mini-game. Namely, this feature makes the game more strategic. Also, a map of the board game consists of cells arranged in a grid pattern so that characters have a lot of options of migration routes, which feature makes the game further more strategic.

2. Modifications

The above embodiment may be modified as described below. It is of note that two or more modifications described below may be combined with each other.

2-1. Modification 1

Game device 1 may be a stationary game device. Storage unit 12, display unit 13, and operation input unit 14 of game device 1 may be separated from the game device; in other words, game program 1211 may be executed by an information-processing system. Game program 1211 may be executed by an information-processing device other than game device 1, such as a smartphone, a tablet device, or a wearable device.

2-2. Modification 2

A map of the board game is not required to have a grid pattern; for example, a map may consist of a single route having no fork. In another example, cells constituting a map may be separated from each other, or may be different in shape or size from each other.

2-3. Modification 3

Movement amount identifying unit 111, when identifying a movement amount, may cause display unit 13 to display, instead of an animation of a die being cast, an animation of a roulette wheel being spun or an animation of a card being drawn from a stack of cards on which different numbers are written.

2-4. Modification 4

Delay time determining unit 114, instead of determining a delay time based on a distance from a character's position to a mini-game cell, may assign a uniform delay time to all characters that have failed to reach a mini-game cell. In another example, delay time determining unit 114 may rank characters in ascending order of distance from a character's position to a mini-game cell, and assign a delay time to each character based on its ranking. An incremental value in delay time between the rankings may be constant.

2-5. Modification 5

Either upper display unit 131 or lower display unit 132 of display unit 13 may simultaneously display a mini-game execution screen and a delay time display screen. A delay time display screen may show a display time with a graph or a numerical value, instead of with a distance from a character's position to a mini-game cell. A delay time display screen may show a character itself, instead of an icon representing a character.

2-6. Modification 6

Game program 1211 may be provided to game device 1 via a computer-readable non-transitory storage medium, which includes a magnetic storage medium such as a magnetic tape or a magnetic disk, an optical storage medium such as an optical disk, or a magneto-optical storage medium. Alternatively, game program 1211 may be provided to game device 1 via a network such as the Internet.

What is claimed is:

1. A non-transitory storage medium storing a program for enabling a player to play a game in which characters including at least a player character operated by the player are moved on a map including cells displayed on a display unit, and for causing a computer to execute a process, the process comprising:

identifying, for each of the characters, a movement amount, based on which each of the characters is moved on the map, the movement amount being randomly determined;

moving each of the characters, on the map based on a movement amount determined for each of the characters; and executing a mini-game on detecting that a first character included in the characters has reached a predetermined first cell on the map, wherein:

the step of moving each of the characters comprises moving the player character on the map based on an input operation performed by the player and a movement amount determined for the player character; and the step of executing a mini-game comprises:

starting the mini-game, the first character joining the mini-game from the start of the mini-game; and causing a second character included in the characters to join the mini-game subsequent to the first character with a delay, the second character having failed to reach the first cell as of the start of the mini-game.

2. The non-transitory storage medium according to claim 1, wherein the process further comprises determining a time of the delay according to a distance from a cell occupied by the second character as of the start of the mini-game to the first cell.

3. The non-transitory storage medium according to claim 1, wherein the step of executing a mini-game comprises shortening a time of the delay in response to a predetermined input operation performed by the player operating the player character, the player character being the second character.

4. The non-transitory storage medium according to claim 1, wherein the step of moving each of the characters comprises moving the player character on the map based on a movement amount determined for the player character along a route selected by the player.

5. The non-transitory storage medium according to claim 1, wherein the process further comprises causing the second character to obtain an item on detecting that the second character has reached a predetermined second cell.

6. The non-transitory storage medium according to claim 5, wherein the item enables an increase in a ranking of the second character determined as a result of the mini-game.

7. The non-transitory storage medium according to claim 5, wherein:

the process further comprises identifying, subsequent to acquisition of the item by the second character, for each of the characters, a movement amount, based on which each of the characters is moved on the map; and the item enables an increase in a movement amount determined for the second character subsequent to the acquisition of the item, as compared to a case where the item is not used, or enables a reduction in a movement amount determined for another character subsequent to the acquisition of the item, as compared to the case where the item is not used.

8. The non-transitory storage medium according to claim 5, wherein the item enables an increase in a value that determines winning or losing of the game.

9. The non-transitory storage medium according to claim 1, wherein the step of executing a mini-game comprises causing the display unit to display simultaneously an execution screen of the mini-game and a delay time display screen showing a time that elapses before the second character joins the mini-game.

10. The non-transitory storage medium according to claim 9, wherein the delay time display screen shows an animation of the second character or a mark indicating the second character, the second character or the mark moving from a cell occupied by the second character as of the start of the mini-game to the first cell.

11. The non-transitory storage medium according to claim 1, wherein in the mini-game, a ranking is determined for each of the characters as a result of the mini-game, the ranking being proportional to a value accumulated during a period from the start of the mini-game until a predetermined end condition for the mini-game is satisfied.

12. The non-transitory storage medium according to claim 1, wherein the process further comprises identifying, subsequent to conclusion of the mini-game, for each of the characters, a movement amount, based on which each of the characters, is moved on the map, the movement amount being randomly determined.

13. The non-transitory storage medium according to claim 1, wherein the step of moving each of the characters comprises simultaneously moving the characters on the map based on movement amounts determined for the characters.

14. An information-processing device that enables a player to play a game in which characters including at least a player character operated by the player are moved on a map including cells displayed on a display unit, the information-processing device comprising:
   a movement amount identifying unit configured to identify, for each of the characters, a movement amount, based on which each of the characters is moved on the map, the movement amount being randomly determined;
   a movement processing unit configured to move each of the characters on the map based on a movement amount determined for the character; and
   a mini-game execution unit configured to execute a mini-game on detecting that a first character included in the characters has reached a predetermined first cell on the map, wherein:
   the movement processing unit is configured to move the player character on the map based on an input operation performed by the player and a movement amount determined for the player character; and
   the mini-game execution unit is configured to:
   start the mini-game, the first character joining the mini-game from the start of the mini-game; and
   cause a second character included in the characters to join the mini-game subsequent to the first character with a delay, the second character having failed to reach the first cell as of the start of the mini-game.

15. The information-processing device according to claim 14, further comprising a delay time determining unit configured to determine a time of the delay according to a distance from a cell occupied by the second character as of the start of the mini-game to the first cell.

16. The information-processing device according to claim 14, wherein the mini-game execution unit is configured to shorten a time of the delay in response to a predetermined input operation performed by the player operating the player character, the player character being the second character.

17. The information-processing device according to claim 14, wherein the mini-game execution unit is configured to cause the display unit to display simultaneously an execution screen of the mini-game and a delay time display screen showing a time that elapses before the second character joins the mini-game.

18. The information-processing device according to claim 14, wherein in the mini-game, a ranking is determined for each of the characters as a result of the mini-game, the ranking being proportional to a value accumulated during a period from the start of the mini-game until a predetermined end condition is satisfied for the mini-game.

19. An information-processing system that enables a player to play a game in which characters including at least a player character operated by the player are moved on a map including cells displayed on a display unit, the information-processing system comprising:
   a movement amount identifying unit configured to identify, for each of the characters, a movement amount, based on which each of the characters is moved on the map, the movement amount being randomly determined;
   a movement processing unit configured to move each of the characters on the map based on a movement amount determined for the character; and
   a mini-game execution unit configured to execute a mini-game on detecting that a first character included in the characters has reached a predetermined first cell on the map, wherein:
   the movement processing unit is configured to move the player character on the map based on an input operation performed by the player and a movement amount determined for the player character; and
   the mini-game execution unit is configured to:
   start the mini-game, the first character joining the mini-game from the start of the mini-game; and
   cause a second character included in the characters to join the mini-game subsequent to the first character with a delay, the second character having failed to reach the first cell as of the start of the mini-game.

20. An information-processing method carried out by an information-processing device, the information-processing device enabling a player to play a game in which characters including at least a player character operated by the player are moved on a map including cells displayed on a display unit, the information-processing method comprising:
   identifying, for each of the characters, a movement amount, based on which each of the characters is moved on the map, the movement amount being randomly determined;
   moving each of the characters on the map based on a movement amount determined for the character; and
   executing a mini-game on detecting that a first character included in the characters has reached a predetermined first cell on the map, wherein:
   the step of moving each of the characters comprises moving the player character on the map based on an input operation performed by the player and a movement amount determined for the player character; and
   the step of executing a mini-game comprises:
   starting the mini-game, the first character joining the mini-game from the start of the mini-game; and
   causing a second character included in the characters to join the mini-game subsequent to the first character with a delay, the second character having failed to reach the first cell as of the start of the mini-game.

* * * * *